United States Patent

Grabscheid et al.

[11] Patent Number: 5,853,359
[45] Date of Patent: Dec. 29, 1998

[54] DEFLECTION ADJUSTMENT ROLL

[75] Inventors: Joachim Grabscheid, Heuchlingen; Christian Schiel, Heidenheim, both of Germany

[73] Assignee: Voith Sulzer Papiermaschinen GmbH, Heidenheim, Germany

[21] Appl. No.: 873,564

[22] Filed: Jun. 12, 1997

[30] Foreign Application Priority Data

Jun. 13, 1996 [DE] Germany ................. 196 23 652.5

[51] Int. Cl.⁶ ................................. B21B 29/00
[52] U.S. Cl. ................................. 492/7; 492/20
[58] Field of Search .............. 492/7, 20; 162/358.3, 162/272, 275

[56] References Cited

U.S. PATENT DOCUMENTS

| | | | |
|---|---|---|---|
| 4,287,021 | 9/1981 | Justus et al. | 162/358 |
| 4,308,096 | 12/1981 | Cronin | 162/272 |
| 4,563,245 | 1/1986 | Wanke et al. | 162/358 |
| 5,074,019 | 12/1991 | Link | 492/7 |
| 5,286,245 | 2/1994 | Schiel | 492/7 |
| 5,650,047 | 7/1997 | Meschenmoser | 492/7 |

FOREIGN PATENT DOCUMENTS

| | | |
|---|---|---|
| 2550366 | 5/1977 | Germany . |
| 3528333 | 1/1989 | Germany . |
| 4420104 | 12/1995 | Germany . |

Primary Examiner—Irene Cuda
Attorney, Agent, or Firm—Greenblum & Bernstein, P.L.C.

[57] ABSTRACT

Deflection adjustment roll that includes a rotating roll jacket, a support member axially extending through the roll jacket, a plurality of at least one of hydrostatic and hydrodynamic support elements located next to one another with a predetermined spacing in an axial direction of the roll jacket to support the roll jacket on the support member, and a fluid removal device that removes operating fluid collected on an inner surface of the roll jacket during operation and that forms a fluid ring that circulates around the plurality support elements on the inner surface of the roll jacket. The fluid removal device may include a plurality of fluid stripping elements formed on the plurality of support elements that laterally protrude from each support element in a direction of a neighboring support element to strip the fluid circulating around the plurality of support elements from the roll jacket in the flow channels formed between the support elements.

33 Claims, 5 Drawing Sheets

DEFLECTION ADJUSTMENT ROLL

CROSS-REFERENCE TO RELATED APPLICATIONS

The present invention claims priority under 35 U.S.C. § 119 of German Patent Application No. 196 23 652.5 filed on Jun. 13, 1996, the disclosure of which is expressly incorporated by reference herein in its entirety.

BACKGROUND OF THE INVENTION

1. Field of the Invention

The present invention relates to a deflection adjustment roll that includes a rotating roll jacket, a support member that axially passes axially through the roll jacket, and a plurality of support elements, e.g., hydrostatic and/or hydrodynamic support elements, disposed next to one another and spaced apart in an axial direction of the roll. The support elements may support the roll jacket on the support member via a fluid cushion formed between support member and the roll jacket. A fluid removal apparatus may be provided for removing operating fluid, e.g., lubricant, from a portion of an interior surface of the roll that collects on the interior surface of the roll during operation. The operating fluid collected on the interior surface of the roll may form a fluid ring that circulates around the support elements on an inner circumference of the roll jacket.

2. Discussion of Background Information

In a deflection adjustment roll of the prior art, operating fluid, in particular oil, supplied, e.g., via the support elements must be removed again from the interior portion (inner side) of the roll. When a deflection adjustment roll having support elements located adjacent the top inside surface of the roll is utilized as a bottom roll, the operating fluid can be wiped from the interior portion of the roll jacket by the support elements and can be discharged in a manner supported by gravity. However, a deflection adjustment roll having support elements located adjacent the bottom inside surface of the roll cannot be utilized as a bottom roll, and, when utilized as a top roll, e.g., as disclosed in DE 25 50 366 A1, a reservoir is located between the yoke and an end section of the roll jacket.

In the deflection adjustment rolls of the prior art, it is particularly problematic that relatively thick oil rings can form in the roll, which in turn bring high splash-induced power losses that occur, e.g., when circulating around the support elements.

SUMMARY OF THE INVENTION

An object of the present invention may be to produce a deflection adjustment roll of the type discussed above such that fluid quantity contained on an interior portion of the roll and correspondingly, splash-induced power losses associated with the fluid quantity, may be easily and reliably reduced to a minimum.

The above object may be achieved according to the present invention by a plurality of fluid stripping elements formed on the support elements as part of a fluid removal apparatus. The stripping elements may laterally protrude from each support element in a direction of a neighboring support element and strip the fluid circulating around the support elements from the interior surface of the roll jacket in flow channels formed between the support elements.

In this embodiment, the support elements and the fluid stripping elements provided on the support elements may act concertedly on the fluid entrained by the roll jacket and circulating around the support elements. The fluid stripping elements may optimize an oil quantity that can be stripped so that the fluid quantity contained on the inner surface of the roll may be reduced to a predetermined minimum. Thus, the fluid film coatings formed on the inside surface of the roll may be kept sufficiently thin and, correspondingly, the splash-induced power losses that occur due to the fluid circulation around the support elements are slight.

According to a preferred embodiment, the fluid stripping elements may be at least partially located and/or formed such that they are only active when the deflection adjustment roll is utilized as a bottom roll, i.e. when the support elements (and the fluid stripping elements) are positioned in an upper half of the roll. Consequently, the fluid stripping elements may remain inactive when the deflection adjustment roll is utilized as a top roll, i.e. when the support elements (and the fluid stripping elements) are positioned in an oil sump located or formed at a bottom of the roll.

As is known in the art, when used in a same machine, different rotation directions for the roll jacket are produced when a deflection adjustment roll is used as a top roll as opposed to a bottom roll. Thus, according to the present invention, fluid stripping elements may be suitably located and/or formed to only be active when the roll jacket rotates in one direction and to remain essentially inactive when the roll jacket rotates in the opposite direction.

Therefore, according to a particular embodiment of the present invention, the support elements may be simply formed as round elements and the fluid stripping elements, which may be formed, e.g., as blade-shaped, may radially protrude radially from the support elements. The fluid stripping elements, when active, may be located in an upstream region of the support elements with respect to a direction of rotation of the roll jacket, i.e., a region oriented toward the circulating fluid ring, and may be directed counter to a circulating direction of the fluid ring. Conversely, the fluid stripping elements, when inactive, may be located in a downstream region of the support elements, i.e., remote from the circulating fluid ring, and may be directed in the circulating direction of the fluid ring.

Each of the tips of the fluid stripping elements may be advantageously coupled to respective support element, e.g., by a substantially horizontal strut to reduce a flow resistance of the active fluid stripping elements. Accordingly, the struts may respectively extend from the tips of the fluid stripping elements into a region of a central axis of the support elements extending parallel to the roll axis.

According to a preferred embodiment, two fluid stripping elements may be located on opposite sides of each support element and, e.g., may be formed as symmetrical to the central axis of the support element extending perpendicular to the roll axis.

In order to deliberately strip away the fluid rings formed or produced from the fluid entrained by the roll jacket that circulates around the support elements, particularly when the fluid stripping elements are inactive, scraper elements are provided adjacent the inner circumference of the roll jacket and axially positioned along the length of the roll jacket to include spaces associated with the support elements. In this embodiment, the fluid stripping elements deliberately act on the discrete fluid rings produced by fluid entrained by the roll jacket that circulates around the support elements. Therefore, the fluid quantity contained on the inner surface of the roll jacket may be reduced to a minimum. At the same time, friction losses may be kept low, even in comparison with rolls using a continuous stripping blade.

According to a preferred embodiment, an axial length of the scraper elements may be greater than a distance between the support elements. This enables the scraper elements to remove the discrete fluid rings from the inner circumference of the roll jacket over its entire length. It is noted that, after leaving the flow channels formed between the support elements, the discrete fluid rings may become somewhat wider. The scraper elements may also be active when the fluid stripping elements are active, so as to strip the narrow fluid rings flowing (or formed) between the active fluid stripping elements from the inner circumference of the roll jacket.

In a preferred embodiment, at least one fluid discharge may be associated with the fluid stripping elements and/or the scraper elements for fluid discharge supported or assisted by gravity. Thus, relatively costly mechanisms and/or devices for aspirating the discharged or removed fluid may be eliminated.

Furthermore, at least one air deflection plate, that forms a gap with the roll jacket, may precede the fluid stripping elements and/or the scraper elements. The at least one air deflection plate may be sized so that the operating fluid entrained by the roll jacket may pass through, but only a slight amount of border layer air entrained within the operating fluid by the roll jacket may pass through. Accordingly, the fluid stripped by the fluid stripping elements or the scraper elements may flow away smoothly and is not stirred up by any air entrained by the roll jacket. In this regard, this feature may be satisfied by a gap of only a few millimeters.

The present invention may be directed to a deflection adjustment roll that includes a rotating roll jacket, a support member axially extending through the roll jacket, a plurality of at least one of hydrostatic and hydrodynamic support elements located next to one another with a predetermined spacing in an axial direction of the roll jacket to support the roll jacket on the support member, and a fluid removal device that removes operating fluid collected on an inner surface of the roll jacket during operation and that forms a fluid ring that circulates around the plurality of support elements on the inner surface of the roll jacket. The fluid removal device may include a plurality of fluid stripping elements formed on the plurality of support elements that laterally protrude from each support element in a direction of a neighboring support element to strip the fluid circulating around the plurality of support elements from the roll jacket in the flow channels formed between the support elements.

According to another feature of the present invention, the plurality of fluid stripping elements may be at least one of partially located and formed to be active only when the roll jacket rotates in one direction and to remain substantially inactive when the roll jacket rotates in an opposite direction.

According to another feature of the present invention, the plurality of support elements may include round support elements and the plurality of fluid stripping elements may protrude in a substantially radial direction from the plurality of support elements. When active, the plurality of fluid stripping elements may be located on an upstream region of the plurality of support elements relative to the one direction to be oriented toward the circulating fluid ring and are directed against a fluid flow, and, when inactive, the plurality of fluid stripping elements may be located on a downstream region of the plurality of support elements relative to the opposite direction to be remote from the circulating fluid ring and are directed into the fluid flow.

According to a further feature of the present invention, the plurality of fluid stripping elements may include tips coupled to a respective support element by reinforcing struts extending approximately in the fluid flow direction to reduce a flow resistance of the plurality of fluid stripping elements when inactive. Further, the reinforcing struts may be coupled substantially tangent to an outer circumference of the respective support element.

According to still another feature of the present invention, two fluid stripping elements may be formed on each respective support element and may be positioned on opposite sides of the respective support element.

According to another feature of the present invention, the fluid stripping elements are formed on the plurality of support elements to be symmetrical to a radial plane extending through a central axis of the respective support element and perpendicular to an axis of rotation for the deflection adjustment roll.

According to a still further feature of the present invention, the plurality of fluid stripping elements are one of at least partially located and formed to be active only when the plurality of support elements and plurality of fluid stripping elements are arranged in an upper half of the roll jacket, and to remain inactive when the plurality of support elements and the plurality of fluid stripping elements are arranged in a bottom half of the roll jacket. Further, when the plurality of fluid stripping elements are active, the deflection adjustment roll is positioned as a bottom roll and when the plurality of stripping elements remain inactive, the deflection adjustment roll is positioned as a top roll.

According to still another feature of the present invention, scraper elements may be arranged along the axial length of and adjacent to the inner surface of the roll jacket. The arrangement of scraper elements may include spaces corresponding to the plurality of support elements to strip the fluid flowing between the plurality of support elements from the inner surface of the roll jacket at least when the plurality of fluid stripping elements are inactive. An axial length of the scraper elements may be at least equal to the predetermined spacing between the plurality of support elements, and, alternatively, may be greater than the predetermined spacing between the plurality of support elements.

According to a further feature of the present invention, at least one of the scraper elements may be formed to produce a wedge gap between the inner surface of the roll jacket and the at least one scraper element. The at least one scraper element may be active only when the roll jacket rotates in the opposite direction and the at least one scraper element may permit fluid to pass when the roll jacket rotates in the one direction due to a hydrodynamic effect produced by the wedge gap.

According to another feature of the present invention, at least one of the scraper elements may be pressed against the inner surface of the roll jacket by a compression spring supported on the support member.

According to a further feature of the present invention, the deflection adjustment roll may also include at least one fluid recess, for a gravity-supported fluid discharge, associated with at least one of the plurality of fluid stripping elements and the scraper elements. Further, the at least one fluid recess may be formed between two strips located on top of the support member to collect fluid stripped by the at least one of the plurality of fluid stripping elements and scraper elements.

According to yet another feature of the present invention, the deflection adjustment roll may also include at least one air deflection plate, preceding at least one of the plurality of fluid stripping elements and the scraper elements, positioned, with respect to the inner surface of the roll jacket, to form a gap of predetermined size. The predetermined size may be sufficient to allow fluid entrained by the roll jacket and a small amount of border air to pass through the gap. Further, the predetermined size of the gap may be less than approximately 5 mm.

According to another feature of the present invention, the operating fluid may include a lubricant.

According to yet another feature of the present invention, the deflection adjustment roll may also include a fluid cushion formed between the support elements and the supporting member.

The present invention may be directed to a deflection adjustment roll that includes a roll jacket having an inner surface and being rotatable around a longitudinal axis, support elements positioned adjacent the inner surface of the roll jacket, and flow channel spaces formed between the support elements. The support elements and the flow channel spaces may be arranged along a length of the roll jacket. The deflection adjustment roll may also include a fluid stripping device coupled to the support elements and arranged to form fluid rings by removing operating fluid from the inner surface when the roll jacket rotates in a first direction and to form fluid rings by substantially deflecting the operating fluid on the inner surface when the roll jacket rotates in a second direction that is opposite the first direction.

According to another feature of the present invention, the support elements may include rounded elements and the fluid stripping device may include fluid stripping elements radially extending from the rounded elements. The fluid stripping elements may include an active side for removing operating fluid and an inactive side for substantially deflecting operating fluid.

According to still another feature of the present invention, the roll jacket may also include an upper portion and a lower portion. When the fluid stripping device is positioned in the upper portion of the roll jacket, the roll jacket may rotate in the first direction. Alternatively, when the fluid stripping device is positioned in the lower portion of the roll jacket, the roll jacket may rotate in the second direction.

According to a further feature of the present invention, scraper elements may be positioned adjacent the inner surface and opposite the support elements, and may be arranged along the length of the roll jacket to be radially opposite the flow channel spaces formed between the support elements.

According to still another feature of the present invention, the scraper elements may be arranged to remove operating fluid from the inner surface when the roll jacket rotates in the second direction. Alternatively, the scraper elements may be arranged to allow operating fluid to remain on the inner surface when the roll jacket rotates in the first direction.

According to a still further feature of the present invention, the scraper elements may include a beveled portion arranged to form a wedge gap between the inner surface and the beveled portion. Further, the scraper elements may include a removal portion, opposite the beveled portion, to remove operating fluid from the inner surface.

According to another feature of the present invention, the scraper elements may include a length greater than or equal to the flow channel spaces.

According to still another feature of the present invention, the deflection adjustment roll may also include a first fluid recess that may receive the operating fluid removed by the fluid stripping device and a second fluid recess that may receive the operating fluid removed by the scraper elements.

According to a still further feature of the present invention, the support elements may be held against the inner surface via a pressure fluid and the scraper elements may be held against the inner surface via a spring force.

According to yet another feature of the present invention, the support elements may include at least one of hydrostatic and hydrodynamic support elements.

Other exemplary embodiments and advantages of the present invention may be ascertained by reviewing the present disclosure and the accompanying drawing figures.

BRIEF DESCRIPTION OF THE DRAWINGS

The present invention may be further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing figures making apparent to those skilled in the art how the invention may be embodied in practice.

Figure 1:
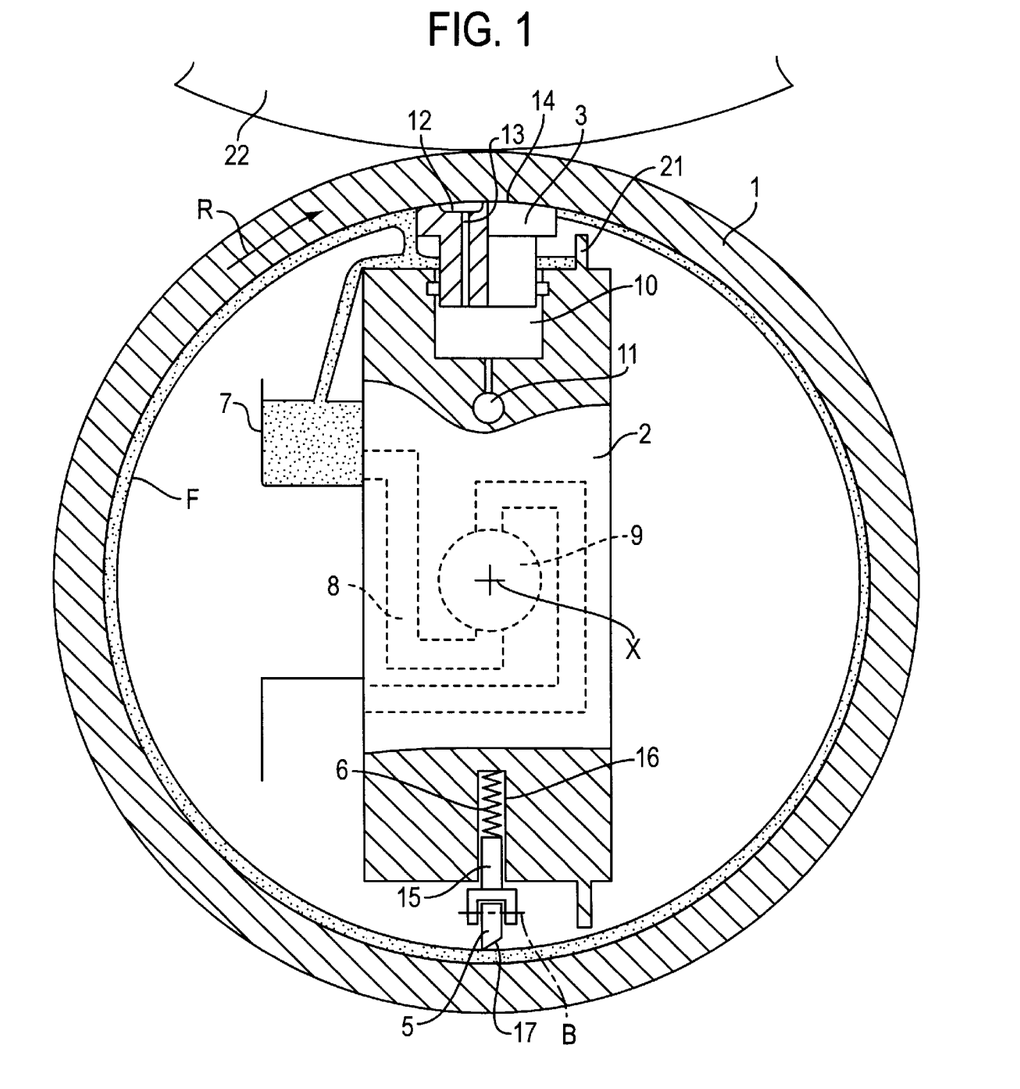
FIG. 1 illustrates a simplified schematic cross-section of a deflection adjustment roll utilized as a bottom roll.

In a schematic cross-sectional representation, FIG. 1 illustrates a deflection adjustment roll according to the present invention. The deflection adjustment roll may include a rotating roll jacket 1, a support member or yoke 2 axially passing through roll jacket 1, and a plurality of hydrostatic and/or hydrodynamic support elements 3 that support roll jacket 1 on support member 2. The plurality of support elements 3 may be located next to each other along an axial direction of the roll jacket, and the support elements may be positioned to have a space, e.g., a distance a, between adjacent support elements. To exert a predetermined radial pressure against an interior surface of roll jacket 1, a fluid cushion may be formed between support member 2 and support elements 3. Further, the radial pressure exerted by the support elements against the interior surface of the roll jacket may also be exerted against a counter roll 22 so as to form a nip.

Support elements 3 may be formed, e.g., as piston-shaped elements and may be sealingly inserted into pressure chambers 10 formed in support member 2. A supply line 11 may be provided in support member 2 to provide pressure fluid to pressure chamber 10, and the pressure fluid may be utilized to adjustably press support elements 3 against the inner surface of roll jacket 1.

Each support elements 3 may have an end slip surface 14 for contacting a portion of roll jacket 1. Hydraulic pressure pockets 12 may be formed on end slip surfaces 14 and may communicate with a respective pressure chamber 10 to receive a supply of pressure fluid.

Figure 3:
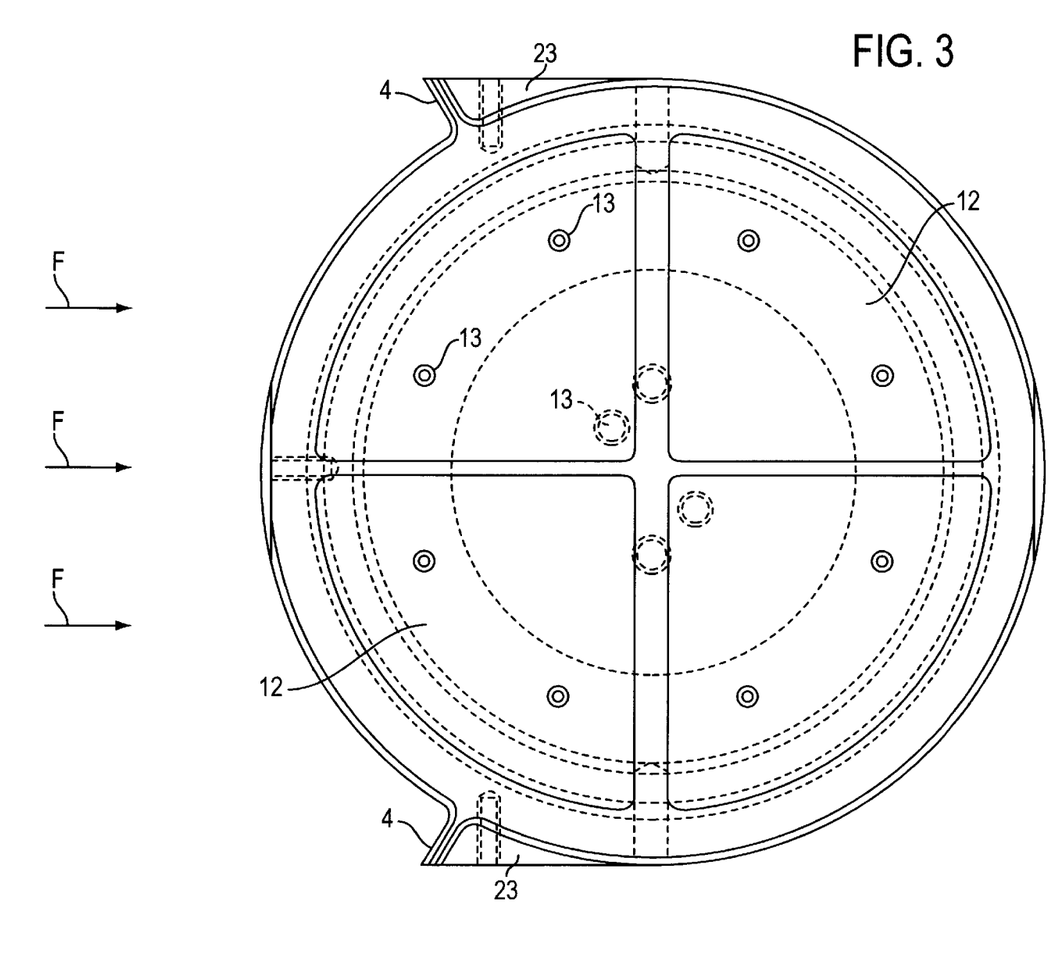
FIG. 3 illustrates an enlarged top view of a support element of the deflection adjustment roll according to the present invention.
Figure 4:
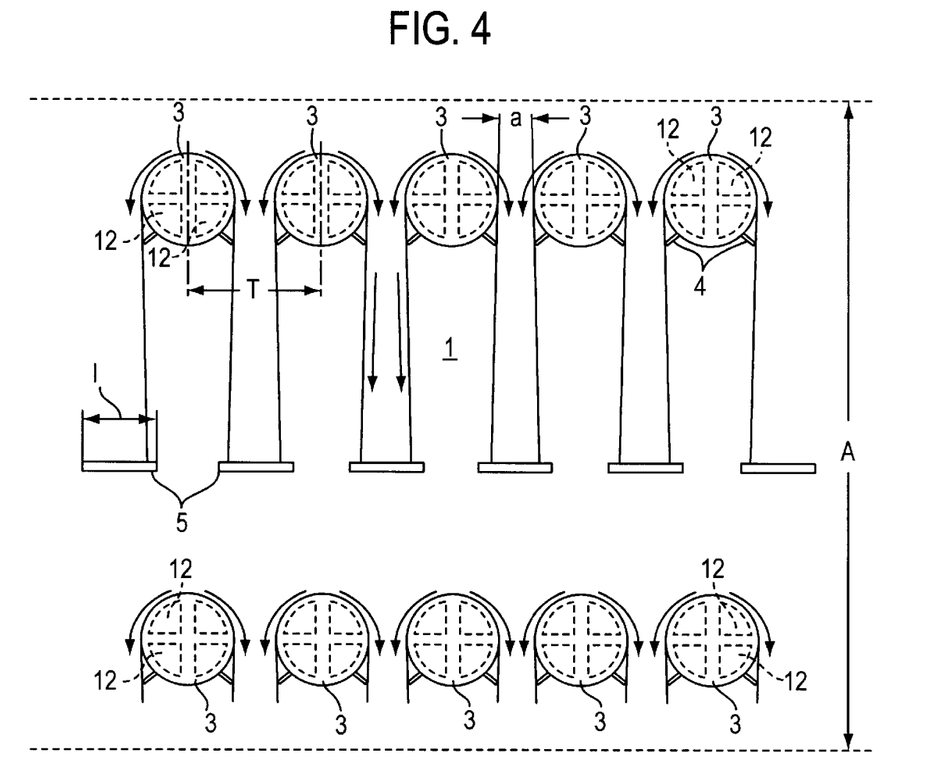
FIG. 4 illustrates a top view of an inner surface of the roll jacket of the deflection adjustment roll depicted in FIG. 1 which is depicted as unwound over an arc of more than 360°.

FIGS. 3 and 4 illustrate that support elements 3 may be formed as rounded elements and that two fluid stripping elements 4 that may be located on a round outer circumference of each support element 3. Fluid stripping elements 4 associated with each support element 3 may be symmetrical to a central axis of the respective support element 3, and each central axis of respective support elements 3 may extend perpendicular to a roll axis X (see FIG. 1). Fluid stripping elements 4 may each laterally protrude from support elements 3 and may extend into flow channels formed between adjacent support elements 3 to deliberately strip operating fluid circulating in the flow channels, i.e., around the support elements 3, from the inner surface of roll jacket 1. However, in accordance with the present invention, fluid stripping elements 4 may be formed such that they are only active when roll jacket 1 rotates in one particular direction and they remain substantially inactive when roll jacket 1 rotates in an opposite direction.

Accordingly, fluid stripping elements 4 may be formed, e.g., as blade-shaped elements and may respectively substantially radially protrude or extend from support elements 3. When active, fluid stripping elements 4 may also be positioned on an upstream region of support elements 3 with respect to a roll rotation direction R, i.e, a region oriented toward a fluid flow F, and may be directed counter to fluid flow F entrained by roll jacket 1, e.g., as indicated in FIG. 3.

However, if fluid flow F is reversed, i.e., the roll rotation direction is reversed, then support elements 3 will likewise be flowed against in the opposite direction. Accordingly, fluid stripping elements 4 may be positioned on a downstream region of the support elements 3, i.e., a region remote from circulating fluid F, and may be directed in the flow direction of fluid F, as shown in FIG. 4. In this manner, fluid stripping elements 4 offer only a slight flow resistance and, therefore, are considered substantially inactive.

To maintain as low a flow resistance as possible, and to reinforce the relatively narrow fluid stripping elements 4, the tips of the fluid stripping elements may each be coupled to support element 3 by a reinforcing strut 23 extending substantially parallel to fluid flow direction F, and which may connect the tip of fluid stripping element 4 to a substantially tangential extension from the outer circumference of support element 3.

The deflection adjustment roll illustrated in FIG. 1 is utilized as a bottom roll. Accordingly, fluid stripping elements 4 may be directed counter to the fluid F entrained by roll jacket 1, or roll rotation direction R. Therefore, fluid stripping elements are active to wipe fluid F circulating around support elements 3 from the inner surface of roll jacket 1. The stripped fluid F may be collected into a fluid recess 7 coupled to a side portion of support member 2. The stripped fluid may then be conveyed out of the roll through an outlet line 8 coupled between fluid recess 7 and a central discharge line 9. As shown in the Figure, central discharge line 9 may be positioned lower than fluid recess 7 so that the stripped fluid may be discharged solely due to hydrostatic pressure or gravity. Thus, the present invention does not require an aspiration device for removing the fluid stripped by the fluid stripping elements 4.

On an underside of support member 2, i.e., the side opposite support elements 3, a plurality of scraper elements 5 may be provided. Scraper elements 5 may be arranged over an axial length of roll jacket 1. As is more clearly illustrated in FIG. 4, which depicts the deflection adjustment roll as unwound over an arc A of more than 360° to show the spaced relationship and relative arrangement between support elements 3 and scraper elements 5, scraper elements 5 may be positioned relative to spaces "a" formed between adjacent support elements 3 so as to strip the fluid, flowing between, and channeled by, support elements 3, from the inner circumference of roll jacket 1.

Scraper elements 5 may have an axial length 1 and may be arranged to be offset relative to spacing a between support elements 3. For example, scraper elements 5 may be offset from support elements 3 by a half spacing T of the support element arrangement, i.e., scraper elements 5 may be positioned adjacent a circumferential portion of the roll jacket between adjacent support elements 3. Further, axial length 1 of scraper elements 5 may be slightly larger than distance a between adjacent support elements 3. In this manner, scraper elements 5 may be utilized to remove discrete fluid rings from an entire width of the inner circumference of roll jacket 1. The discrete fluid rings may be formed from the fluid entrained on the interior surface of roll jacket 1 that flows around support elements 3 (as shown by the arrows, and the discrete fluid rings may become somewhat wider after passing through the flow channels formed between the support elements 3.

Scraper elements 5 may be formed, e.g., like fluid stripping elements 4, so that they are only active in one rotational direction of roll jacket 1, e.g., when fluid stripping elements 4 are inactive. In this arrangement, when stripping elements are inactive, scraper elements 5 may be active so as to strip the fluid rings formed between the support elements 3 from the inner surface of roll jacket 1.

In the embodiment shown, the scraper element 5 may be pressed against the inner surface of roll jacket 1 by a spring force. Thus, scraper element 5, which may be formed, e.g., as blade-like, may be coupled, e.g., to a tappet 15. In this manner, scraper element 5 may pivot around an axis B perpendicular to roll axis X, and tappet 15 may be guided to move radially toward roll jacket 1 in a recess 16 provided in support member 2. A compression spring 6 may be inserted into recess 16 to provide a desired spring force to scraper element 5 against the inner surface of roll jacket 1.

Each scraper element 5 may be provided with an oblique face 17 oriented toward the inner surface of roll jacket 1 to produce a wedge gap between the inner circumference of roll jacket 1 and the respective scraper element 5 held against it. Accordingly, scraper elements 5 may only be active when roll jacket 1 is rotated in a direction that the fluid is directed to the non-wedged side of scraper element 5, i.e., opposite direction R shown in FIG. 1. However, when roll jacket 1 is rotated in direction R, as shown in FIG. 1, the hydrodynamic effect produced by the wedge gap permits fluid F to pass.

In the embodiment depicted in FIG. 1, the deflection adjustment roll is utilized as a bottom roll of a press device, in which roll jacket 1 is rotated in a direction R. As noted above, fluid stripping elements 4, provided on support elements 3, are active so as to strip the fluid F circulating around support elements 3 from the inner surface of roll jacket 1. At the same time, scraper elements 5 are inactive and, thus, allow fluid F to pass through due to the hydrodynamic effect produced by the wedge gap between oblique face 17 and roll jacket 1.

Figure 2:
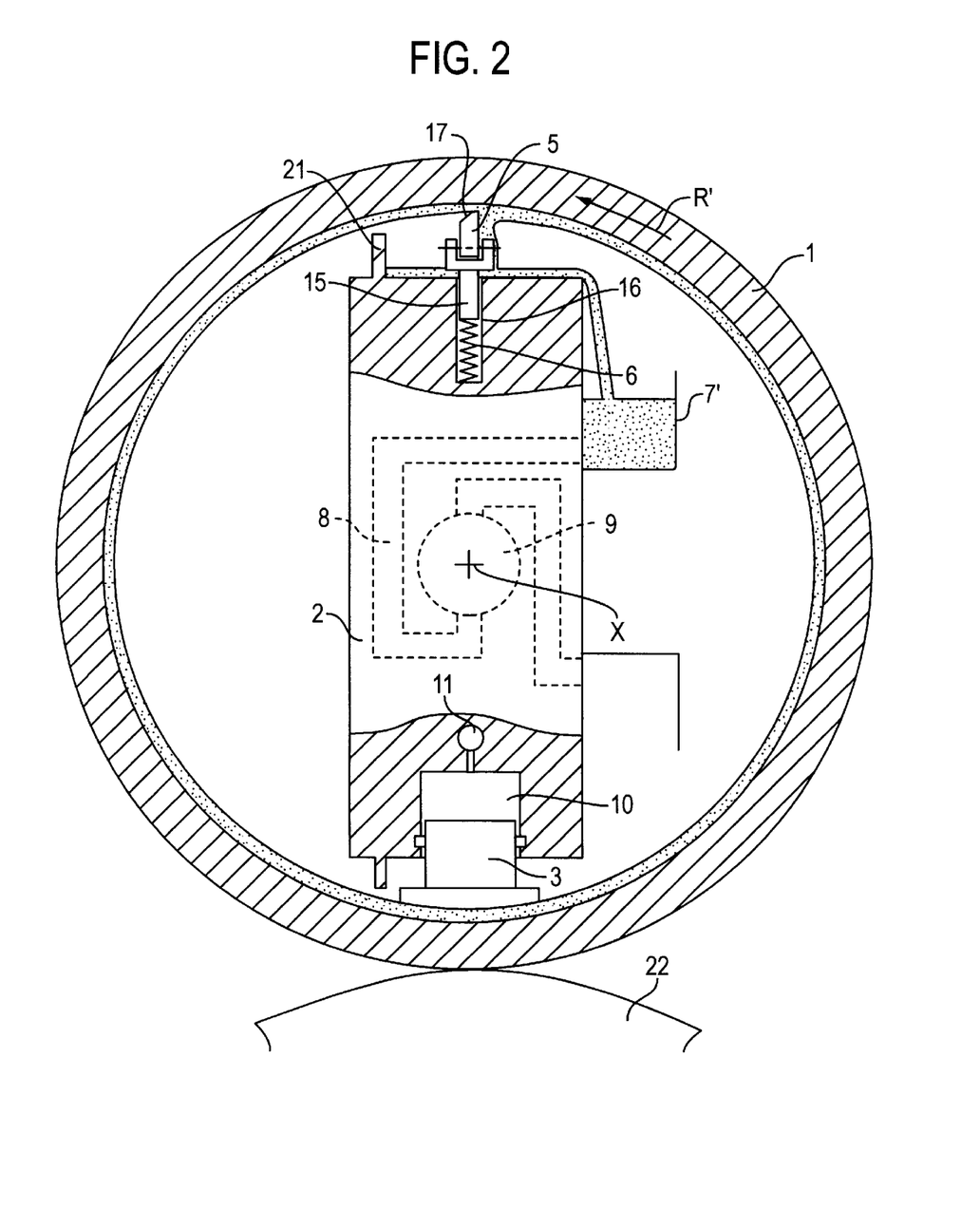
FIG. 2 illustrates a simplified schematic cross-section of a deflection adjustment roll utilized as a top roll.

If the deflection adjustment roll, as depicted in FIG. 2, is utilized as a top roll, then roll jacket is rotated in a direction R', which is opposite direction R from FIG. 1. In this arrangement, fluid stripping elements 4 are inactive and, thus, extend substantially in the flow direction of fluid F. Fluid F contacts support element 3 at the end opposite fluid stripping elements so that the fluid is hardly stripped from roll jacket 1, rather fluid F is guided around support elements 3 to form the discrete fluid rings as fluid F is transported through the flow channels between adjacent support elements 3, as shown in FIG. 4. However, scraper elements 5 are positioned in their active position so as to strip the discrete fluid rings formed through the flow channels between support elements 3 from roll jacket 1.

Further, a fluid recess 7' may be associated with scraper elements 5 to collect the stripped fluid. Fluid recess 7' may be coupled to an outlet line 8 that feeds or guides the stripped fluid from fluid recess 7' to central discharge line 9. As noted above, with respect to fluid recess 7', central discharge line 9 may be positioned lower than fluid recess 7' so that the stripped fluid may be discharged solely due to hydrostatic pressure or gravity. Thus, the present invention also does not require an aspiration device for removing the fluid stripped by scraper device 5.

Figure 5:
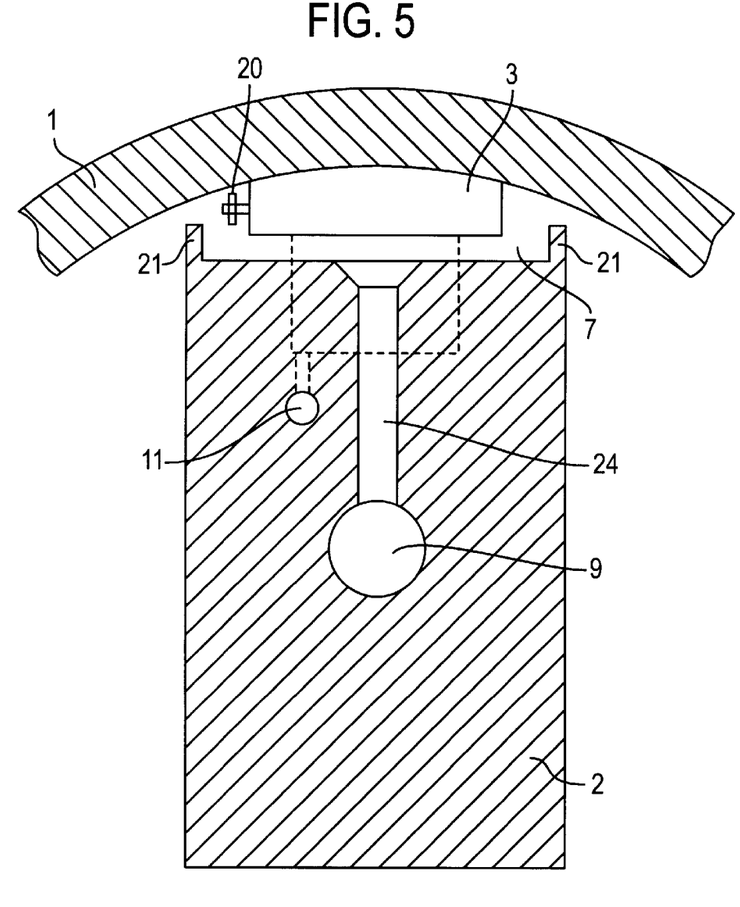
FIG. 5 illustrates a simplified schematic cross-section of an alternative embodiment of a deflection adjustment roll utilized as a top roll.
Figure 6:
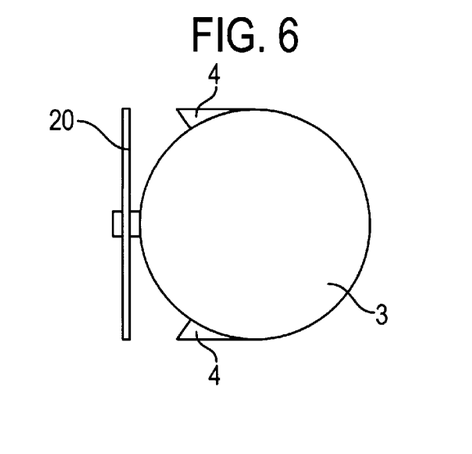
FIG. 6 illustrates a top view of the support element of the deflection adjustment roll depicted in FIG. 5 having a preceding air deflection plate.

According to an alternative embodiment of the present invention illustrated in FIGS. 5 and 6, an air deflection plates 20 may be attached to support elements 3 to precede the fluid stripping elements 4 and/or the doctor elements 5. Air deflection plates 20 are positioned relative to the inner circumference of roll jacket 1 to form a gap of a predetermined size. The size of the gap may be set to enable the operating fluid F entrained by roll jacket 1 to flow unobstructed through the gap and to deflect most of the border air entrained by the fluid F. Thus, a small amount of the border air may be permitted to pass through the gap. In this manner, the fluid stripped by fluid stripping elements 4 or scraper elements 5 may flow away smoothly. The gap distance between air deflection plate 20 and the inner circumference of roll jacket 1 may be, e.g., less than 5 mm.

In the alternative embodiment illustrated in FIG. 5, fluid recess 7 may alternatively be formed between two strips 21 located on the top of support member 2 to collect fluid stripped by fluid stripping elements 4 or by doctor elements 5, whichever elements are active in the arrangement, i.e., located on top of support member 2. Fluid recess 7 may communicate with central discharge conduit 9 through a drop line 24 in order to discharge fluid collected in fluid recess 7 that has been stripped from the roll.

It is noted that the foregoing examples have been provided merely for the purpose of a explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

Reference Numeral List 1 roll jacket
2 support member
3 support element
4 fluid stripping element
5 scraper element
6 compression spring
7 fluid recess
7' fluid recess
8 outlet line
9 central discharge line
10 pressure chamber
11 supply line
12 pressure pocket
13 line
14 slip surface
15 tappet
16 recess
17 oblique face
18 fluid recess
19 channel
20 air deflection plate
21 strips
22 counter roll
23 strut
24 drop line
a distance between support elements
l length of scraper elements
A unwound portion of roll showing an arc of more than 360°
B axis
F fluid
R rotation direction
R' rotation direction (opposite R)
T spacing
X roll axis

What is claimed is:

1. A deflection adjustment roll comprising:

a rotating roll jacket;

a support member axially extending through the roll jacket;

a plurality of at least one of hydrostatic and hydrodynamic support elements located next to one another with a predetermined spacing in an axial direction of the roll jacket to support the roll jacket on the support member;

a fluid removal device that removes operating fluid collected on an inner surface of the roll jacket during operation and that forms a fluid ring that circulates around the plurality of support elements on the inner surface of the roll jacket; and the fluid removal device comprising a plurality of fluid stripping elements formed on the plurality of support elements that laterally protrude from each support element in a direction of a neighboring support element to strip the fluid circulating around the plurality of support elements from the roll jacket in the flow channels formed between the support elements.

2. The deflection adjustment roll according to claim 1, the plurality of fluid stripping elements are at least one of partially located and formed to be active only when the roll jacket rotates in one direction and to remain substantially inactive when the roll jacket rotates in an opposite direction.

3. The deflection adjustment roll according to claim 2, the plurality of support elements comprising round support elements; and the plurality of fluid stripping elements protruding in a substantially radial direction from the plurality of support elements, wherein, when active, the plurality of fluid stripping elements are located on an upstream region of the plurality of support elements relative to the one direction to be oriented toward the circulating fluid ring and are directed against a fluid flow, and wherein, when inactive, the plurality of fluid stripping elements are located on a downstream region of the plurality of support elements relative to the opposite direction to be remote from the circulating fluid ring and are directed into the fluid flow.

4. The deflection adjustment roll according to claim 3, the plurality of fluid stripping elements comprising tips coupled to a respective support element by reinforcing struts extending approximately in the fluid flow direction to reduce a flow resistance of the plurality of fluid stripping elements when inactive.

5. The deflection adjustment roll according to claim 4, the reinforcing struts coupled being substantially tangent to an outer circumference of the respective support element.

6. The deflection adjustment roll according to claim 2, two fluid stripping elements being formed on each respective support element and being positioned on opposite sides of the respective support element.

7. The deflection adjustment roll according to claim 6, the fluid stripping elements are formed on the plurality of support elements to be symmetrical to a radial plane extending through a central axis of the respective support element and perpendicular to an axis of rotation for the deflection adjustment roll.

8. The deflection adjustment roll according to claim 2, wherein the plurality of fluid stripping elements are one of at least partially located and formed to be active only when the plurality of support elements and plurality of fluid stripping elements are arranged in an upper half of the roll jacket, and to remain inactive when the plurality of support elements and the plurality of fluid stripping elements are arranged in a bottom half of the roll jacket.

9. The deflection adjustment roll according to claim 8, wherein, when the plurality of fluid stripping elements are active, the deflection adjustment roll is positioned as a bottom roll, and wherein, when the plurality of stripping elements remain inactive, the deflection adjustment roll is positioned as a top roll.

10. The deflection adjustment roll according to claim 2, further comprising:

scraper elements are arranged along the axial length of and adjacent to the inner surface of the roll jacket; and the arrangement of scraper elements including spaces corresponding to the plurality of support elements to strip the fluid flowing between the plurality of support elements from the inner surface of the roll jacket at least when the plurality of fluid stripping elements are inactive.

11. The deflection adjustment roll according to claim 10, an axial length of the scraper elements being at least equal to the predetermined spacing between the plurality of support elements.

12. The deflection adjustment roll according to claim 11, the axial length of the scraper elements being greater than the predetermined spacing between the plurality of support elements.

13. The deflection adjustment roll according to claim 10, at least one of the scraper elements is formed to produce a wedge gap between the inner surface of the roll jacket and the at least one scraper element, wherein the at least one scraper element is active only when the roll jacket rotates in the opposite direction, and wherein the at least one scraper element permits fluid to pass when the roll jacket rotates in the one direction due to a hydrodynamic effect produced by the wedge gap.

14. The deflection adjustment roll according to claim 10, at least one of the scraper elements is pressed against the inner surface of the roll jacket by a compression spring supported on the support member.

15. The deflection adjustment roll according to claim 1, further comprising at least one fluid recess, for a gravity-supported fluid discharge, associated with at least one of the plurality of fluid stripping elements and the scraper elements.

16. The deflection adjustment roll according to claim 15, the at least one fluid recess formed between two strips located on top of the support member to collect fluid stripped by the at least one of the plurality of fluid stripping elements and scraper elements.

17. The deflection adjustment roll according to claim 1, further comprising:

at least one air deflection plate, preceding at least one of the plurality of fluid stripping elements and the scraper elements, positioned, with respect to the inner surface of the roll jacket, to form a gap of predetermined size, wherein the predetermined size is sufficient to allow fluid entrained by the roll jacket and a small amount of border air to pass through the gap.

18. The deflection adjustment roll according to claim 17, the predetermined size of the gap being less than approximately 5 mm.

19. The deflection adjustment roll according to claim 1, the operating fluid comprising a lubricant.

20. The deflection adjustment roll according to claim 1, further comprising a fluid cushion formed between the support elements and the supporting member.

21. A deflection adjustment roll comprising:

a roll jacket having an inner surface and being rotatable around a longitudinal axis;

support elements positioned adjacent the inner surface of the roll jacket;

flow channel spaces located between the support elements;

the support elements and the flow channel spaces arranged along a length of the roll jacket; and a fluid stripping device coupled to the support elements and arranged to form fluid rings by removing operating fluid from the inner surface when the roll jacket rotates in a first direction and to form fluid rings by substantially deflecting the operating fluid on the inner surface when the roll jacket rotates in a second direction that is opposite the first direction.

22. The deflection adjustment roll according to claim 21, the support elements comprising rounded elements;

the fluid stripping device comprising fluid stripping elements radially extending from the rounded elements; and the fluid stripping elements including an active side for removing operating fluid and an inactive side for substantially deflecting operating fluid.

23. The deflection adjustment roll according to claim 21, the roll jacket further comprising an upper portion and a lower portion,
wherein, when the fluid stripping device is positioned in the upper portion of the roll jacket, the roll jacket rotates in the first direction.

24. The deflection adjustment roll according to claim 21, the roll jacket further comprising an upper portion and a lower portion,
wherein, when the fluid stripping device is positioned in the lower portion of the roll jacket, the roll jacket rotates in the second direction.

25. The deflection adjustment roll according to claim 21, further comprising scraper elements positioned adjacent the inner surface and opposite the support elements, and arranged along the length of the roll jacket to be radially opposite the flow channel spaces.

26. The deflection adjustment roll according to claim 25, the scraper elements arranged to remove operating fluid from the inner surface when the roll jacket rotates in the second direction.

27. The deflection adjustment roll according to claim 25, the scraper elements arranged to allow operating fluid to remain on the inner surface when the roll jacket rotates in the first direction.

28. The deflection adjustment roll according to claim 27, the scraper elements including a beveled portion arranged to form a wedge gap between the inner surface and the beveled portion.

29. The deflection adjustment roll according to claim 28, the scraper elements further including a removal portion, opposite the beveled portion, to remove operating fluid from the inner surface.

30. The deflection adjustment roll according to claim 25, the scraper elements comprising a length greater than or equal to the flow channel spaces.

31. The deflection adjustment roll according to claim 25, further comprising:
a first fluid recess that receives the operating fluid removed by the fluid stripping device; and
a second fluid recess that receives the operating fluid removed by the scraper elements.

32. The deflection adjustment roll according to claim 25, wherein the support elements are held against the inner surface via a pressure fluid; and
wherein the scraper elements are held against the inner surface via a spring force.

33. The deflection adjustment roll according to claim 21, the support elements comprising at least one of hydrostatic and hydrodynamic support elements.

* * * * *